United States Patent [19]

Daly

[11] 4,384,113

[45] May 17, 1983

[54] STABILIZATION OF ALKALI POLYSACCHARIDES

[75] Inventor: William H. Daly, Baton Rouge, La.

[73] Assignee: The Dow Chemical Company, Midland, Mich.

[21] Appl. No.: 361,013

[22] Filed: Mar. 23, 1982

[51] Int. Cl.³ .............................. C08B 1/06; C08B 1/08
[52] U.S. Cl. ........................................ 536/101; 536/57; 536/84; 536/102; 536/114; 536/121
[58] Field of Search ................... 536/101, 57, 84, 102, 536/114, 121

[56] References Cited

U.S. PATENT DOCUMENTS

| | | | |
|---|---|---|---|
| 3,873,518 | 3/1975 | Strange et al. ...................... 106/170 |
| 4,015,067 | 3/1977 | Liu et al. ................................ 536/96 |
| 4,250,305 | 2/1981 | Saito et al. ........................... 536/101 |
| 4,254,258 | 3/1981 | Durso .................................. 536/101 |

FOREIGN PATENT DOCUMENTS 55-34279  3/1980  Japan ..................................... 536/90

Primary Examiner—Ronald W. Griffin

[57] ABSTRACT

Improved basic polysaccharides are prepared by contacting a polysaccharide with a tetravalent onium salt such as tetramethylammonium chloride prior to contacting it with a strong base such as sodium hydroxide. Polysaccharide derivatives having a greater degree and uniformity of substitution are prepared from such improved basic polysaccharides.

7 Claims, No Drawings

STABILIZATION OF ALKALI POLYSACCHARIDES

BACKGROUND OF THE INVENTION

This invention relates to stabilized alkali polysaccharides and methods for the preparation thereof.

Derivatives of polysaccharides, such as cellulose ethers, have a wide diversity of properties ranging from organic-soluble thermoplastic products useful in film applications to water-soluble food additives. Such derivatives, particularly the polysaccharide ethers, are generally manufactured from a preformed polymer, e.g., cellulose, that contains chains of β-anhydroglucose rings. In the ether derivatives, these rings are substituted with various monovalent organic radicals such as methyl, ethyl, benzyl, hydroxyethyl, hydroxypropyl, carboxymethyl and combinations thereof. The chemical nature, quantity and distribution of the substituent groups of the polysaccharide govern such properties as solubility, surface activity, thermoplasticity, film characteristics and biodegradability.

In the commercial production of polysaccharide ethers and other polysaccharide derivatives, the polysaccharide is first mixed with strong alkali, e.g., aqueous sodium hydroxide, in the presence of air. Subsequently, this alkali polysaccharide is reacted with etherifying agent, e.g., alkyl halide, monochlorocarboxylic acid or vicinal epoxide. Usually the alkyl chloride contains from 1 to 2 carbon atoms, the chloro acid contains from 2 to about 4 carbon atoms and the epoxide can contain from 2 to 4 carbon atoms and it can be halogenated, e.g., as in epichlorohydrin. The alkyl chlorides react to form alkyl ethers, the chloro acids form carboxyalkyl ethers and the epoxides form hydroxyalkyl ethers. Mixtures of alkyl chloride and vicinal epoxide form derivatives having both alkyl ether and hydroxyalkyl ether groups on the polysaccharide. A mixture of alkyl chloride and chlorocarboxylic acid yields a polysaccharide having both alkyl ether and carboxyalkyl ether groups. If desired, all three types of etherifying agents can be mixed for reaction with the polysaccharide to form a polysaccharide derivative having alkyl, carboxyalkyl and hydroxyalkyl ether groups on the polysaccharide. This reaction can be effected in a dry medium wherein the alkali polysaccharide, after preparation, is reacted with nonaqueous liquid reactants such as the aforementioned etherifying agents in quantities insufficient to make a slurry. Alternatively, the reaction can be effected in the presence of small quantities of water, with or without the addition of an inert diluent.

Unfortunately, the preparation of the polysaccharide derivatives by the aforementioned conventional procedures often yields products having poor quality. This poor quality is believed to be caused by the lack of uniform distribution of the substituent groups on the polymer backbone of the polysaccharide derivative. For example, when such substituents are uniformly distributed on the polysaccharide backbone, the polysaccharide derivative will dissolve easily in solvent and form superior films. When such distribution is not uniform, the resulting polysaccharide derivative does not dissolve easily and has poor film forming properties when used as a coating. In addition, the etherifying agents such as alkyl halides not only react with the polysaccharide but also react with water which may be present in the reaction. Thus, in order to increase the effective utilization of the etherifying agent, highly concentrated aqueous solutions of alkali are employed. This practice prevents the uniform dispersion of alkali in the polysaccharide which causes nonuniform distribution of ether groups in the resulting polysaccharide derivative. Finally, the use of such concentrated alkali often causes partial degradation of the polysaccharide, thereby causing the formation of polysaccharide derivatives having molecular weights lower than desired.

Various techniques have been employed in the past to overcome this problem of nonuniform distribution of substituent groups on the polysaccharide. For example, attempts to modify polysaccharides in homogeneous solutions of dimethyl sulfoxide in the presence of formaldehyde as described by Semour and Johnson, *Polymer Preprints* 17, 382 (1976) or in dimethyl acetamide in the presence of lithium chloride as described by C. L. McCormick et al., ACS Symposium Series 121, 371 (1980) involve expensive solvents and do not lead to quantitative substitutions. Alternately, the polysaccharide may be dispersed in an inert solvent such as isopropanol or tert-butanol prior to treatment with concentrated alkali solutions to assure a more even dispersal of hydroxide ions in the polysaccharide matrix. However, all of these methods employ expensive procedures and do not satisfactorily eliminate the nonuniform distribution of substituent groups in the polysaccharide. Moreover, many do not adequately alleviate the problem of alkali degradation of the polysaccharide.

In view of the foregoing deficiencies of conventional techniques for preparing derivatives of polysaccharides, it is highly desirable to provide an improved method for preparing such derivatives wherein uniform distribution of substituents is achieved without significant degradation of the polysaccharide.

SUMMARY OF THE INVENTION

The present invention is, in one aspect, a method for making an improved basic polysaccharide. This method comprises the steps of (1) contacting a polysaccharide with a tetravalent onium salt under conditions such that the salt is dispersed in or distributed on the polysaccharide and (2) mixing the onium/polysaccharide with a strong base under conditions sufficient to provide a basic polysaccharide having a molecular weight essentially the same as the molecular weight of the starting polysaccharide.

In a second aspect, the invention is a method for preparing a polysaccharide derivative comprising steps 1 and 2 of the foregoing method and the additional step of contacting the basic polysaccharide produced in step 2 with a substituting reagent under conditions such that the extent of substitution and/or the uniformity of distribution of substituents on the resulting polysaccharide derivative is greater than that of a polysaccharide derivative prepared by reacting an alkali polysaccharide which contains no onium salt with the substituting reagent. In a final aspect, the invention is a basic polysaccharide comprising a polysaccharide, an onium salt and a strong base wherein the onium salt is added to the polysaccharide prior to the addition of the strong base.

Surprisingly, the practice of the present invention yields a basic polysaccharide which has a molecular weight essentially the same as the polysaccharide used to prepare the basic polysaccharide and can be reacted with a substituting reagent to provide a polysaccharide derivative having uniform distribution of substituents on the polysaccharide. Such polysaccharide derivatives are useful in the preparation of films, coatings, as thickening agents for neutral or alkaline aqueous media, as muscilages or glues, as thickening agents for food, as paper additives and latex paint thickeners, and other known uses for polysaccharide derivatives.

DETAILED DESCRIPTION OF THE ILLUSTRATIVE EMBODIMENTS

For the purposes of this invention, the term "polysaccharide" includes the various celluloses which may be derived from wood pulp, cotton fiber and other vegetable tissues as well as synthetic celluloses such as rayon and cellophane, natural gum such as arabic, tragacanth, karaya, guar, xanthan, and the like; starches including modified starches as well as derivatives of the aforementioned celluloses, starches and gums. Such polysaccharides are generally characterized as combinations of nine or more monosaccharides linked together by glycosidic bonds. Of particular interest are the celluloses derived from wood pulp and cotton, as well as their substituted derivatives wherein the substituents are alkyl, particularly ethyl or methyl, hydroxyalkyl, such as hydroxypropyl and hydroxyethyl and carboxymethyl. Of the aforementioned celluloses, the wood pulp and cotton are most preferred.

The onium salts suitably employed in the practice of this invention are salts having (1) an onium cation in which a tetravalent ion such as ammonium phosphonium or arsenium are covalently bonded to four organic radicals and (2) a suitable counterion such that the onium salt is capable of acting as a phase transfer catalyst between an aqueous liquid phase and an organic liquid phase. Of particular interest for this purpose are the quaternary salts represented by the formula:

$(AM)^+X^-$ wherein M is a tetravalent ion derived from N, P and As, A is an organic portion of the salt molecule bonded to M by four covalent linkages and X is an anion which will dissociate from the cation $(AM)^+$ in an aqueous environment. It is understood that dibasic quaternary salts having two of the tetravalent ions substituted in the manner described are included as well as polybasic salts which may be polymeric in character with the described group being repeated a number of times. Preferred quaternary salts have the formula:

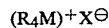

$(R_4M)^+X^\ominus$ which may be monobasic, dibasic or polybasic as mentioned hereinbefore wherein M is N or P, more preferably N, and X is as defined as hereinbefore and each R is individually monovalent hydrocarbon radical such as alkyl, alkenyl, aryl, alkaryl, ar-alkyl and cycloalkyl. Although less preferred than the aforementioned hydrocarbon radicals, R is also suitably hydroxyalkyl. It is especially preferred that the total number of carbon atoms in the sum of the R groups should be at least 4 and is no greater than about 24. Preferably, this total number of carbon atoms is from 4 to 8. Moreover, it is recognized that two of the R groups may be taken collectively together with the quaternized atom (M) to form a 5- or 6-membered heterocyclic ring group which may also contain one atom of nitrogen, sulfur or oxygen within the ring. For example, the two groups may collectively be alkylene such as —(CH$_2$)$_4$— or —(CH$_2$)$_5$— or alkyleneimino alkylene such as —(CH$_2$)$_2$NH(CH$_2$)$_2$— and others such as—(CH$_2$)$_2$O(CH$_2$)$_2$—, —(CH$_2$)$_2$SCH$_2$— and —(CH$_2$)$_2$OCH$_2$—. More preferably, R is an alkyl or aryl group of 1 to 12 carbon atoms, most preferably alkyl having 1 to 7 carbon atoms; M is nitrogen; and A is a neutralizing monovalent anion such as chloride, bromide, iodide, tosylate, acetate, methylsulfate and bisulfate, most preferably chloride or bromide. The following are illustrative of the most preferred quaternary ammonium salts: tetraalkylammonium salts such as the chlorides, bromides, iodides, bisulfates, tosylates of tetraalkylammonium wherein tetraalkyl is tetramethyl, tetraethyl, tetra(n-propyl), tetra(n-butyl), tetra(n-pentyl) and tetrahexyl or combinations of different alkyl groups such as trimethylethyl, dimethyldiethyl and methyltriethyl, trioctylmethyl and tridecylmethyl. Examples of other preferred ammonium salts are tetrabenzylammonium chloride, benzyltrimethyl-, benzyltriethyl-, benzyltributyl- and phenethyltrimethylammonium chlorides, bromides and the like; arylammonium salts such as triphenylmethylammoniumbromide or chloride, N,N,N-trimethylanilinium chloride, N,N,N-triethylanilinium bromide, benzyltrimethylammonium halides and benzyltriethylammonium halides. Examples of suitable phosphonium and sulfonium salts are listed by Herriot and Picker, J. Am. Chem. Soc., 97, 2345 (1975).

The strong base which is employed in the practice of this invention is generally an alkali metal hydroxide or a mixture of an alkali metal hydroxide and an ammonium hydroxide including substituted ammonium hydroxide as well as quaternary ammonium hydroxide. Exemplary strong bases are sodium hydroxide, potassium hydroxide, ammonium hydroxide and quaternary ammonium hydroxides wherein the quaternary ammonium group is as defined for the aforementioned onium salts. Also suitable are other onium hydroxides such as quaternary phosphonium hydroxides wherein quaternary phosphonium is as defined hereinbefore for the onium compound. Of the foregoing strong bases, aqueous solutions of sodium hydroxide and potassium hydroxide are preferred, with sodium hydroxide being especially preferred. In addition, when quaternary ammonium hydroxides or other onium hydroxides are employed as a part of the strong base, the amount of onium salt required in the practice of this invention is reduced and, in some instances, the need for onium salt is actually eliminated. Such instances arise when the onium salt can be formed in situ as a result of adding an aqueous solution of onium hydroxide to a substituting reagent such as alkyl halide or monohalocarboxylic acid.

In the preparation of a basic polysaccharide by the method of this invention, the polysaccharide, usually in the form of (1) a dry powder or (2) a particulate slurried in a aqueous or nonaqueous liquid medium, is contacted with the onium salt in a manner such that the onium salt becomes intimately coated on or commingled with the polysaccharide. In instances wherein the polysaccharide is in the form of a dry particulate, it is desirable to contact the polysaccharide with the onium salt dissolved in an aqueous medium, preferably by spraying the aqueous solution of onium salt in order to form a coating on the dry particulate of polysaccharide. In instances wherein the polysaccharide is first slurried in an aqueous or nonaqueous liquid, the onium salt can be added in dry form to this slurry or can be first dissolved in water or other solvent and then added to the slurry. In all instances, it is desirable to achieve intimate contact between the polysaccharide and the onium salt before the polysaccharide is contacted with an alkali metal hydroxide. In general, the amount of onium salt used in the practice of this invention is that which will stabilize the polysaccharide against degradation when it is subsequently contacted with an alkali metal hydroxide. Preferably, this amount of onium salt is in the range from about 1 to about 12, most preferably from about 2 to about 5, weight percent based on the weight of dry polysaccharide.

This onium-treated polysaccharide is then converted to basic polysaccharide by any conventional manner used to form basic polysaccharides. Typically, the basic polysaccharide is prepared by contacting the onium-treated polysaccharide with from about 3 to about 6 moles of strong base per molar equivalent of anhydroglucose units. Normally such base in the form of a 35–75 weight percent solution of strong base in water is added under ambient conditions to the onium-treated polysaccharide. Illustratively, a dip tank such as described in U.S. Pat. No. 2,949,452; a spray mixer as described in U.S. Pat. No. 2,469,764 or a slurry reactor described in U.S. Pat. No. 2,131,733 is suitably employed to obtain the desired basic polysaccharide. In this procedure, it is desirable to minimize contact with air in order to further reduce viscosity loss or degradation.

The resulting basic polysaccharide which also contains the onium salt is now ready for reaction to form the desired polysaccharide derivative. In general, any reaction that is normally carried out between a basic polysaccharide and a substituting reagent is suitably employed in the practice of this invention. For example, the basic polysaccharide can be reacted with an alkyl halide such as methyl chloride or ethyl chloride to form a derivative such as methylcellulose or ethylcellulose. Alternatively, the basic polysaccharide may be reacted with (1) an alkylene oxide such as ethylene oxide or propylene oxide to form a derivative such as hydroxyethylcellulose or hydroxypropylcellulose or (2) a chlorocarboxylic acid to form a carboxymethylcellulose. Alternatively, the basic polysaccharide may be reacted with other substituting reagents or mixtures thereof as such substituting reagents are described hereinbefore. Procedures and conditions used to carry out these reactions are suitably those conventionally employed to form derivatives of polysaccharides, e.g., as such procedures and conditions are described by A. B. Savage, "Cellulose Ethers" in Encyclopedia of Polymer Science, 3, 459–549 (1965).

The following examples are given to illustrate the invention and should not be construed as limiting its scope. Unless otherwise indicated all parts and percentages are by weight.

EXAMPLE 1

A cellulose powder having an average particle size of 200 micrometers is prepared from ground, bleached wood cellulose (pulp grade) by a standard dry screening procedure. A solution of 2 g (0.018 mole) of tetramethylammonium chloride in 2 ml of water is sprayed onto 36 g of the cellulosic powder. This resulting onium treated cellulose powder is then mixed with a solution of 30 g (0.75 mole) of sodium hydroxide in 30 ml of water which is preheated to 120° C. The resulting mixture is stirred for 10 minutes while the temperature is allowed to equilibrate between 60° and 80° C. The resulting pale yellow alkali cellulose is charged into a 2 liter pipe bomb, to which is added 80 g (2 moles) of sodium hydroxide, 250 g (4 moles) of ethyl chloride and 250 ml of toluene. The bomb is then sealed and the mixture is heated with agitation of 135° C. for 2 hours. During this time a maximum pressure of 190 psi is observed. After cooling to 5° C., the bomb is opened and unreacted ethyl chloride is allowed to evaporate. The contents of the bomb are poured into 2 liters of water to form a suspension of ethylcellulose resin and water. This suspension is heated to boiling in order to remove the toluene by steam distillation. When no toluene remains, the ethylcellulose is recovered by filtration, washed with water and resuspended in 1 liter of water. The resulting suspension is adjusted to a pH of 6 by adding hydrochloric acid. The resulting neutralized ethylcellulose is isolated and dried in vacuo at 60° C. for 12 hours. The recovered ethylcellulose (46 g) has a degree of substitution (DS) of 1.56, a weight average molecular weight of 63,600 and an intrinsic viscosity of 0.89 in toluene at 30° C.

For purposes of comparison, a sample of ethylcellulose is prepared according to the foregoing conditions except that no tetramethylammonium chloride is added. The ethylcellulose is recovered in reduced yield (21 g) due to higher water solubility of derivatives having reduced degrees of substitution. The recovered ethylcellulose (DS=1.16), when partially acylated, exhibits a weight average molecular weight of 26,600 and an intrinsic viscosity of 0.5 in toluene.

As evidenced by the foregoing comparison, the addition of an onium salt to the cellulose significantly reduces molecular weight loss and improves degree of substitution.

EXAMPLE 2

Following the procedure of Example 1, several samples of wood cellulose in powder form are converted to ethylcellulose and tested for degree of substitution and molecular weight. The results of these tests are reported in Table I. For purposes of comparison, the foregoing procedure is employed except that the tetramethylammonium chloride is added to the cellulose after conversion to alkali cellulose. These resulting ethylcelluloses are also tested for degree of substitution and molecular weight. The results of these tests are also reported in Table I.

TABLE I

| Sample No. | Treatment Conditions | | | Time[4], hrs. | DS[5] | Acetyl[6], % | $\eta$[7] | Mw[8] |
|---|---|---|---|---|---|---|---|---|
| | TMAC[1] | Temp[2], °C. | ATM[3] | | | | | |
| 1 | PRE | 120 | Argon | 2 | 1.67 | 1.20 | 0.957 | 71,000 |
| C$_1$* | POST | 120 | Argon | 2 | 0.73 | 2.53 | 0.550 | 30,600 |
| 2 | PRE | 120 | Air | 2 | 1.56 | 7.90 | 0.895 | 63,600 |
| C$_2$* | POST | 120 | Air | 2 | 1.16 | 5.17 | 0.503 | 26,600 |
| 3 | PRE | 120 | Oxygen | 2 | 1.81 | 1.50 | 0.781 | 52,000 |

TABLE I-continued

| Sample No. | Treatment Conditions TMAC[1] | Temp[2], °C. | ATM[3] | Time[4], hrs. | DS[5] | Acetyl[6], % | η[7] | Mw[8] |
|---|---|---|---|---|---|---|---|---|
| C₃* | POST | 120 | Oxygen | 2 | 0.84 | 6.87 | 0.565 | 31,900 |

*Not an example of this invention.
[1]TMAC - tetramethylammonium chloride where PRE means that the cellulose is treated with TMAC before contact with base and POST means the cellulose is converted to alkali cellulose prior to treatment with TMAC.
[2]Temp - temperature in °C. of the preheated 50 percent sodium hydroxide solution. Equilibrium temperature of the reaction mixture is 80° C.
[3]ATM - type of gas present in the reactor during the pretreatment process.
[4]Time - time in hours for ethylation at 135° C.
[5]DS - degree of substitution of ethyl on the cellulose.
[6]Acetyl - mole percent of acetyle groups substituted on the ethylcellulose by reacting it with acetyl chloride in methylene chloride at 25° C. in the presence of a 40 percent NaOH solution.
[7]η - intrinsic viscosity of acetylated cellulose (in toluene at 30° C.).
[8]Mw - weight average molecular weight of acetylated cellulose determined using gel permeation chromatography (0.125 percent of the acetylated cellulose in methylene chloride).

As evidenced by the data shown in Table I, the treatment of the ground wood cellulose with tetramethylammonium chloride prior to conversion of the cellulose to an alkali cellulose as in Sample Nos. 1-3 provides a substantially increased degree of substitution and significantly reduces molecular weight loss when compared to cellulose which is converted to alkali cellulose prior to treatment with tetramethylammonium chloride as described in Sample Nos. C₁-C₃.

EXAMPLE 3

Following the procedure of Example 1, several samples of dry ground wood cellulose are pretreated with various onium salts and subsequently converted to alkali cellulose and then to ethylcellulose under the conditions described in Example 1 as modified by the procedures described in Footnote (2) of Table II hereinafter. The resulting samples of ethylcellulose are tested for degree of substitution and the results are reported in Table II.

For purposes of comparison, several control samples (Sample Nos. C₁-C₃) are also run in the absence of an onium salt. These samples are similarly tested for degree of substitution and the results are reported in Table II.

TABLE II

| Sample No. | Onium Salt[1] Type | Amount | Pretreatment[2] | DS[3] |
|---|---|---|---|---|
| 1 | TMAC | 2.0g, 0.018M | A | 1.56 |
| 2 | TMAC | 2.0g, 0.018M | B | 1.51 |
| 3 | TMAC | 2.0g, 0.018M | C | 1.95 |
| 4 | TEAC | 3.0g, 0.018M | C | 2.0 |
| 5 | TPAC | 4.0g, 0.018M | C | 1.9 |
| 6 | TBAC | 5.0g, 0.018M | C | 1.85 |
| 7 | TAAC | 6.0g, 0.018M | C | 1.80 |
| 8 | THAC | 7.0g, 0.018M | C | 1.80 |
| 9 | DMMB | 3.53g, 0.018M | A | 1.13 |
| 10 | DMMB | 3.53g, 0.018M | B | 1.45 |
| 11 | DMPC | 2.69g, 0.018M | A | 1.16 |
| 12 | DMPC | 2.69g, 0.018M | B | 1.46 |
| 13 | MTPPB | 6.56g, 0.018M | B | 1.21 |
| A₁* | HMEADAB | 5.51g, 0.018M | B | 0.93 |
| A₂* | TSI | 3.67g, 0.018M | A | 0.81 |
| A₃* | TSOI | 3.96g, 0.018M | A | 0.82 |
| A₄* | DMBHEAC | 3.05g, 0.018M | A | 0.64 |
| A₅* | TMHEAC | 2.51g, 0.018M | A | 0.47 |
| C₁* | None | | A | 1.10 |
| C₂* | None | | B | 0.98 |
| C₃* | None | | C | 1.45 |

*Not an example of the invention.
[1]TMAC - tetramethylammonium chloride
TEAC - tetraethylammonium chloride
TPAC - tetra(n-propyl)ammonium chloride
TBAC - tetra(n-butyl)ammonium chloride
TAAC - tetra(n-amyl)ammonium chloride
THAC - tetra(n-hexyl)ammonium chloride
DMMB - N,N—dimethylmorpholinium bromide
DMPC - N,N—dimethylpiperidinium chloride
MTPPB - methyl triphenylphosphonium bromide
HMEDAB - N,N,N,N′,N′,N′—hexamethylethylenediammonium bromide
TSI - trimethyl sulfonium iodide
TSOI - trimethyl sulfoxonium iodide
DMBHEAC - dimethylbis(hydroxyethyl)ammonium chloride
TMHEAC - trimethylhydroxyethylammonium chloride
[2]Pretreatment Conditions
A - powdered cellulose-onium salt mixture is treated with 50 percent sodium hydroxide at 120° C. for 10 minutes;
B - powdered cellulose-onium salt mixture and 50 percent sodium hydroxide are slurried in toluene at 110° for 1 hour; and
C - sodium hydroxide is dispersed in toluene and the suspension heated at 110° C. before adding the cellulose-onium salt mixture. The mixture is reheated to 110° C. for 1 hour.
[3]Same as (5) in Table I.

As evidenced by the data in Table II, short chain tetraalkylammonium salts, e.g., wherein alkyl is methyl or ethyl, are the most effective onium salts when the alkali pretreatment is conducted on dry particles of a polysaccharide/onium salt blend. When the pretreatment is effected in a toluene slurry, the more hydrophobic onium salts, e.g., DMMB and DMPC are very effective. Surprisingly, certain hydrophilic onium salts, e.g., DMBHEAC and TMHEAC, appear to inhibit ethylation under some conditions. A similar inhibitory effect is observed when sulfonium and sulfoxonium salts are employed as in Sample Nos. A₂ and A₃.

EXAMPLE 4

A 5 g-portion of ethylcellulose in the form of dry powder is mixed with 10 ml of an aqueous solution of 20 percent tetramethylammonium hydroxide. To this mixture is added 150 ml of methylene chloride and the resulting slurry is stirred for 10 minutes. To the stirred reaction mixture is added dropwise a solution of 25 ml of acetyl chloride in 25 ml of methylene chloride. The reaction is allowed to proceed at room temperature for 2 hours. After this time, the reaction mixture is washed with an excess of water and then neutralized with an aqueous solution of sodium bicarbonate. The resulting product is filtered and dried under vacuum at 60° C. for 24 hours. The resulting esterified ethylcellulose exhibits an acetyl content of 8.18 percent indicating a degree of substitution of acetate of 0.36.

When the foregoing reaction is carried out using an ethylcellulose having a degree of substitution of 1.64, the resulting esterified ethylcellulose has an acetyl content of 7.93 percent indicating a degree of acetyl substitution of 0.37.

Following the foregoing procedure except that tetrabutylammonium hydroxide is substituted for the tetramethylammonium hydroxide, two ethylcelluloses, one having a degree of ethyl substitution of 1.10 and the other having a degree of ethyl substitution of 1.64, are esterified. The resulting esterified ethylcelluloses exhibit an acetyl content of 16.80 percent and 14.97 percent respectively indicating a degree of acetyl substitution of 0.81 and 0.76, respectively.

When the foregoing procedure is followed except that sodium hydroxide is substituted for the tetramethylammonium hydroxide, the resulting esterified ethylcelluloses have a degree of ethyl substitution of 1.10 and 1.64 and degrees of acetyl substitution of 0.26 and 0.43. The percent of acetyl concentration in these celluloses is 6.08 percent and 8.86 percent, respectively.

As evidenced by this data, significant improvement in degree of substitution occurs when an onium hydroxide is employed as the base, particularly when the cellulose having a low degree of substitution is employed as the substrate.

What is claimed is:

1. A method for making an improved basic polysaccharide which comprises the steps of (1) contacting a polysaccharide with a tetravalent onium salt under conditions such that the salt is dispersed in or distributed on the polysaccharide and (2) mixing the resulting onium/polysaccharide with a strong base under conditions sufficient to provide a basic polysaccharide having a molecular weight essentially the same as the initial polysaccharide.

2. The method of claim 1 wherein the polysaccharide is a cellulose, the onium salt is a quaternary ammonium salt and the strong base is an aqueous solution of an alkali metal hydroxide.

3. The method of claim 2 wherein the cellulose is a wood pulp, the onium salt is a tetraalkylammonium chloride having from 4 to 8 carbon atoms and the alkali metal hydroxide is sodium hydroxide.

4. A method for preparing a derivative of a polysaccharide which method comprises contacting the basic polysaccharide of claim 1, 2 or 3, with a substituting reagent under conditions such that the extent of substitution and/or the uniformity of distribution of substituents on the resulting derivative is greater than that of a polysaccharide derivative prepared by reacting an alkali polysaccharide that contains no onium salt with the substituting reagent.

5. The method of claim 3 wherein the substituting reagent is an alkyl halide, an alkylene oxide or a chlorocarboxylic acid.

6. The method of claim 4 wherein the alkyl halide is methyl chloride or ethyl chloride and the alkylene oxide is ethylene oxide or propylene oxide.

7. A basic polysaccharide comprising a polysaccharide, a tetravalent onium salt and a strong base wherein the onium salt is added to the polysaccharide prior to the addition of the strong base.

* * * * *